(12) United States Patent
Dockhorn et al.

(10) Patent No.: US 8,983,150 B2
(45) Date of Patent: Mar. 17, 2015

(54) PHOTO IMPORTANCE DETERMINATION

(71) Applicant: Adobe Systems Incorporated, San Jose, CA (US)

(72) Inventors: Carl I. Dockhorn, San Jose, CA (US); David W. McAllister, Emerald Hills, CA (US); Vikas Vaishnav, Rajasthan (IN); Luke A. Rymarz, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 99 days.

(21) Appl. No.: 13/717,367

(22) Filed: Dec. 17, 2012

(65) Prior Publication Data
US 2014/0169644 A1     Jun. 19, 2014

(51) Int. Cl.
| G06K 9/68 | (2006.01) |
| G06K 9/62 | (2006.01) |
| G06K 9/00 | (2006.01) |
| G06F 17/30 | (2006.01) |

(52) U.S. Cl.
CPC ...... G06K 9/00221 (2013.01); G06F 17/30244 (2013.01); G06K 9/00677 (2013.01)
USPC ............. 382/118; 382/219; 382/224

(58) Field of Classification Search
USPC ......... 382/118, 181, 276, 295, 291, 293, 277, 382/219, 224; 715/738; 707/E17.023, 707/E17.031, E17.026
See application file for complete search history.

(56) References Cited

U.S. PATENT DOCUMENTS

| 5,675,358 | A | 10/1997 | Bullock et al. | |
|---|---|---|---|---|
| 6,282,317 | B1 * | 8/2001 | Luo et al. | 382/203 |
| 6,538,698 | B1 | 3/2003 | Anderson | |
| 6,580,437 | B1 | 6/2003 | Liou et al. | |
| 6,745,186 | B1 | 6/2004 | Testa et al. | |
| 6,819,783 | B2 | 11/2004 | Goldberg et al. | |
| 6,834,122 | B2 | 12/2004 | Yang et al. | |
| 6,915,011 | B2 | 7/2005 | Loui et al. | |

(Continued)

FOREIGN PATENT DOCUMENTS

| EP | 1246085 | 10/2002 |
|---|---|---|
| EP | 1369792 | 12/2003 |

OTHER PUBLICATIONS

"Advisory Action", U.S. Appl. No. 11/394,804, (Apr. 18, 2012), 4 pages.

(Continued)

*Primary Examiner* — Sheela Chawan
(74) *Attorney, Agent, or Firm* — Wolfe-SBMC

(57) ABSTRACT

In embodiments of photo importance determination, a photo analyzer is implemented to analyze the image content of each photo in a set of digital photos, and determine similar photos based on the image content and metadata of the digital photos. The photo analyzer can then create stacks of the similar photos and determine a representative photo from the similar photos in each stack. The photo analyzer can then determine a display sequence to display non-stacked photos and the representative photos of each stack. The photo analyzer can also receive viewer feedback associated with the digital photos being displayed for viewing, and then determine a different representative photo from the similar photos in each of the stacks based on the viewer feedback. The photo analyzer can also determine a revised display sequence of the non-stacked photos and the representative photos of the stacks based on the viewer feedback.

20 Claims, 6 Drawing Sheets

(56) References Cited

U.S. PATENT DOCUMENTS

| | | | |
|---|---|---|---|
| 6,928,233 B1 | 8/2005 | Walker et al. | |
| 6,950,533 B2 * | 9/2005 | Zlotnick | 382/100 |
| 6,956,573 B1 | 10/2005 | Bergen et al. | |
| 7,296,224 B2 | 11/2007 | Atkins et al. | |
| 7,437,005 B2 | 10/2008 | Drucker et al. | |
| 7,580,952 B2 * | 8/2009 | Logan et al. | 1/1 |
| 7,694,236 B2 | 4/2010 | Gusmorino et al. | |
| 7,831,599 B2 | 11/2010 | Das et al. | |
| 8,285,111 B2 | 10/2012 | Otala et al. | |
| 8,326,035 B2 | 12/2012 | Ubillos et al. | |
| 8,326,087 B2 | 12/2012 | Perronnin et al. | |
| 8,385,663 B2 | 2/2013 | Xu et al. | |
| 8,488,914 B2 | 7/2013 | Takayama et al. | |
| 8,639,028 B2 | 1/2014 | Spaeth | |
| 8,897,556 B2 | 11/2014 | Dockhorn et al. | |
| 2002/0001404 A1 | 1/2002 | Yoshikawa et al. | |
| 2002/0009286 A1 | 1/2002 | Kasutani | |
| 2002/0075322 A1 | 6/2002 | Rosenzweig et al. | |
| 2002/0168108 A1 | 11/2002 | Loui et al. | |
| 2003/0026507 A1 | 2/2003 | Zlotnick | |
| 2003/0059107 A1 | 3/2003 | Sun et al. | |
| 2003/0072486 A1 | 4/2003 | Loui et al. | |
| 2003/0084065 A1 | 5/2003 | Lin et al. | |
| 2003/0123713 A1 | 7/2003 | Geng | |
| 2003/0123737 A1 | 7/2003 | Mojsilovic et al. | |
| 2003/0145279 A1 | 7/2003 | Bourbakis et al. | |
| 2003/0152363 A1 | 8/2003 | Jeannin et al. | |
| 2003/0184653 A1 | 10/2003 | Ohkubo | |
| 2003/0189602 A1 | 10/2003 | Dalton et al. | |
| 2003/0195883 A1 | 10/2003 | Mojsilovic | |
| 2003/0206668 A1 | 11/2003 | Nakajima et al. | |
| 2003/0227468 A1 | 12/2003 | Takeda | |
| 2004/0001631 A1 | 1/2004 | Camara et al. | |
| 2004/0208365 A1 | 10/2004 | Loui et al. | |
| 2004/0228504 A1 | 11/2004 | Chang | |
| 2005/0004690 A1 | 1/2005 | Zhang et al. | |
| 2005/0163378 A1 | 7/2005 | Chen | |
| 2005/0283742 A1 | 12/2005 | Gusmorino et al. | |
| 2006/0026524 A1 | 2/2006 | Ma et al. | |
| 2006/0071942 A1 | 4/2006 | Ubillos et al. | |
| 2006/0071947 A1 | 4/2006 | Ubillos et al. | |
| 2006/0106816 A1 | 5/2006 | Oisel et al. | |
| 2006/0195475 A1 | 8/2006 | Logan et al. | |
| 2006/0214953 A1 | 9/2006 | Crew et al. | |
| 2006/0220986 A1 | 10/2006 | Takabe et al. | |
| 2007/0035551 A1 | 2/2007 | Ubillos | |
| 2007/0088748 A1 | 4/2007 | Matsuzaki et al. | |
| 2007/0201558 A1 | 8/2007 | Xu et al. | |
| 2007/0226255 A1 | 9/2007 | Anderson | |
| 2008/0205772 A1 | 8/2008 | Blose | |
| 2009/0123021 A1 | 5/2009 | Jung et al. | |
| 2009/0150376 A1 | 6/2009 | O'Callaghan et al. | |
| 2009/0161962 A1 | 6/2009 | Gallagher et al. | |
| 2009/0220159 A1 | 9/2009 | Tanaka et al. | |
| 2009/0313267 A1 | 12/2009 | Girgensohn et al. | |
| 2010/0128919 A1 | 5/2010 | Perronnin et al. | |
| 2010/0172551 A1 | 7/2010 | Gilley et al. | |
| 2011/0064317 A1 | 3/2011 | Ubillos | |
| 2012/0082378 A1 | 4/2012 | Peters et al. | |
| 2012/0328190 A1 | 12/2012 | Bercovich et al. | |
| 2013/0121590 A1 | 5/2013 | Yamanaka et al. | |
| 2013/0125002 A1 | 5/2013 | Spaeth | |
| 2014/0101615 A1 | 4/2014 | Spaeth | |
| 2014/0169702 A1 | 6/2014 | Dockhorn | |
| 2014/0363101 A1 | 12/2014 | Dockhorn et al. | |

OTHER PUBLICATIONS

"Final Office Action", U.S. Appl. No. 11/394,804, (Jan. 31, 2012), 17 pages.

"Final Office Action", U.S. Appl. No. 11/394,804, (Jul. 7, 2010), 17 pages.

"Non-Final Office Action", U.S. Appl. No. 11/394,804, (Apr. 24, 2013), 18 pages.

"Non-Final Office Action", U.S. Appl. No. 11/394,804, (Jan. 7, 2010), 19 pages.

"Non-Final Office Action", U.S. Appl. No. 11/394,804, (Aug. 15, 2011), 19 pages.

"Notice of Allowance", U.S. Appl. No. 11/394,804, (Sep. 24, 2013), 8 pages.

"Restriction Requirement", U.S. Appl. No. 11/394,804, (Aug. 5, 2009), 6 pages.

Cooper, Matthew et al., "Temporal Event Clustering for Digital Photo Collections", *ACM Transactions on Multimedia Computing, Communications and Applications*, vol. 1, No. 3, (Aug. 2005), pp. 269-288.

Graham, Adrian et al., "Time as Essence for Photo Browsing through Personal Digital Libraries", *Proceedings of the 2nd ACM/IEEE-CS Joint Conference on Digital Libraries*, Jul. 13-17, 2002, Protland, OR, USA, (Jul. 13, 2002), pp. 326-335.

Loui, Alexander C., et al., "Automatic Event Clustering and Quality Screening of Consumer Pictures for Digital Albuming", *IEEE Transactions on Multimedia*, vol. 5, No. 3, (Sep. 2003), pp. 390-402.

Platt, John C., "AutoAibum: Clustering Digital Photographs using Probabilistic Model Merging", *Proceedings of the IEEE Workshop on Content-Based Access of Image and Video Libraries*, (2000), 6 pages.

Platt, John C., et al., "PhotoTOC: Automatic Clustering for Browsing Personal Photographs", *ICICS-PCM*; Singapore, Available at <http://research.microsoft.com/en-us/um/people/jplatt/phototoc-pacrim.pdf>,(Feb. 2002),5 pages.

Rodden, Kerry et al., "How Do People Manage Their Digital Photographs?", *ACM Press*, (2003), 8 pages.

Rui, Yong et al., "Exploring Video Structure beyond the Shots", *Proceedings of IEEE International Conference on Multimedia Computing and Systems*, (1998), 4 pages.

"Corrected Notice of Allowance", U.S. Appl. No. 13/717,422, Sep. 2, 2014, 16 pages.

"Notice of Allowance", U.S. Appl. No. 13/717,422, Jun. 9, 2014, 8 pages.

* cited by examiner

PHOTO IMPORTANCE DETERMINATION

BACKGROUND

Many types of devices today include a digital camera that can be used to capture digital photos, such as with a mobile phone, tablet device, a digital camera, and other electronic media devices. The accessibility and ease of use of the many types of devices that include a digital camera makes it quite easy for most anyone to take photos. For example, rather than just having one camera to share between family members on vacation, each of the family members may have a mobile phone and/or another device, such as a digital camera, that can be used to take vacation photos. Additionally, a user with a digital camera device is likely to take many more photos than in days past with film cameras, and the family may come back from vacation with hundreds, or even thousands, of vacation photos.

A large number of photos can be very time-consuming to sort through, organize, and share with others. Typically, a person has to manually sort through the photos, select the ones to share with others, and then email or upload the selected photos to a photo hosting service to share the photos. It may take hours to select the best or most important photos from a large number of photos, and the importance of photos are selected from the viewpoint of the person sharing the photos. It can also be difficult to discern which of the photos will be meaningful to another person. It may take more time still to select and organize the photos for individualized sharing if the person sharing the photos wants to personalize different sets or subsets of the photos to share with different people. Further, most people would not want to receive such a large number of photos from a friend or family member to look through as a slideshow, or even as thumbnail images of the photos.

SUMMARY

This Summary introduces features and concepts of photo importance determination, which is further described below in the Detailed Description and/or shown in the Figures. This Summary should not be considered to describe essential features of the claimed subject matter, nor used to determine or limit the scope of the claimed subject matter.

Photo importance determination is described. In embodiments, a photo analyzer is implemented to analyze the image content of each photo in a set of digital photos, and determine similar photos based on the image content and metadata of the digital photos. The photo analyzer can then create stacks of the similar photos and determine a representative photo from the similar photos in each stack. The photo analyzer can then determine a display sequence to display non-stacked photos and the representative photos of each stack. The photo analyzer can also receive viewer feedback associated with the digital photos being displayed for viewing, and then determine a different representative photo from the similar photos in each of the stacks based on the viewer feedback. The photo analyzer can also determine a revised display sequence of the non-stacked photos and the representative photos of the stacks based on the viewer feedback.

In embodiments, the photo analyzer can analyze the image content of each photo based on object recognition, facial recognition, and/or facial composition, as well as other photo image content. The photo analyzer can determine the representative photo from the similar photos in a stack based on a photo importance formula that is a function of image content factors. Similarly, the photo analyzer can determine the display sequence of the non-stacked photos and the representative photos of the stacks of similar photos based on a photo importance formula that is a function of the image content factors and a quantity of the similar photos in each of the stacks of similar photos.

In embodiments, the photo analyzer receives the viewer feedback from a viewer client device and the viewer feedback can include identifiers of the photos that are selected for viewing, photo display durations of the selected photos, viewer preferences for the selected photos, and/or viewer photo approval. The photo analyzer can also organize the set of digital photos into chapters, where each chapter includes a subset of the digital photos, and the chapters are organized based on a timestamp of each digital photo and time gaps between the subsets of the digital photos.

BRIEF DESCRIPTION OF THE DRAWINGS

Embodiments of photo importance determination are described with reference to the following Figures. The same numbers may be used throughout to reference like features and components that are shown in the Figures.

DETAILED DESCRIPTION

Embodiments of photo importance determination are described, and a photo analyzer is implemented to analyze and organize a large number of digital photos based on determinations of photo importance. A user can then share the large number of photos without having to take the time to organize them, but still offer an enjoyable experience for a viewer with whom the photos are shared. The photo analyzer analyzes image content to determine similar photos, and then creates stacks of similar photos. An implementation of a photo importance formula can be utilized to determine a representative photo from the similar photos in each stack. The photo analyzer can then utilize another implementation of the photo importance formula to determine a display sequence of non-stacked photos along with the representative photos for each stack of similar photos. The organized photos can then be displayed in chapters and a viewer will be able to see the determined important photos even if only a small subset of the photos are viewed.

Viewer feedback associated with the digital photos displayed for viewing at various client devices can be received, and the photo analyzer can then revise the photo importance determinations based on the viewer feedback. For example, different representative photos for the respective stacks of similar photos can be determined based on the photo importance formula and the viewer feedback. Similarly, a revised display sequence of the non-stacked photos and the representative photos of the stacks of similar photos can be determined based on the photo importance formula and the viewer feedback. The photo importance determinations can be adjusted based on the feedback received from each subsequent viewer, which in-turn improves the viewing experience for the next viewer of the shared photos and for the current viewer's future viewing experiences of the shared photos.

The photo analyzer implements embodiments of photo importance determination so that a user can quickly share a large number of photos with viewers, who are also more likely to enjoy the photo viewing experience of being able to see as few as a small subset of the important photos, yet have the option to view more of the photos that are deemed important to a viewer. Further, the photo importance determinations can be updated based on the viewer feedback to accommodate viewer preferences and interests when viewing the group of shared photos.

While features and concepts of photo importance determination can be implemented in any number of different devices, systems, networks, environments, and/or configurations, embodiments of photo importance determination are described in the context of the following example devices, systems, and methods.

Figure 1:
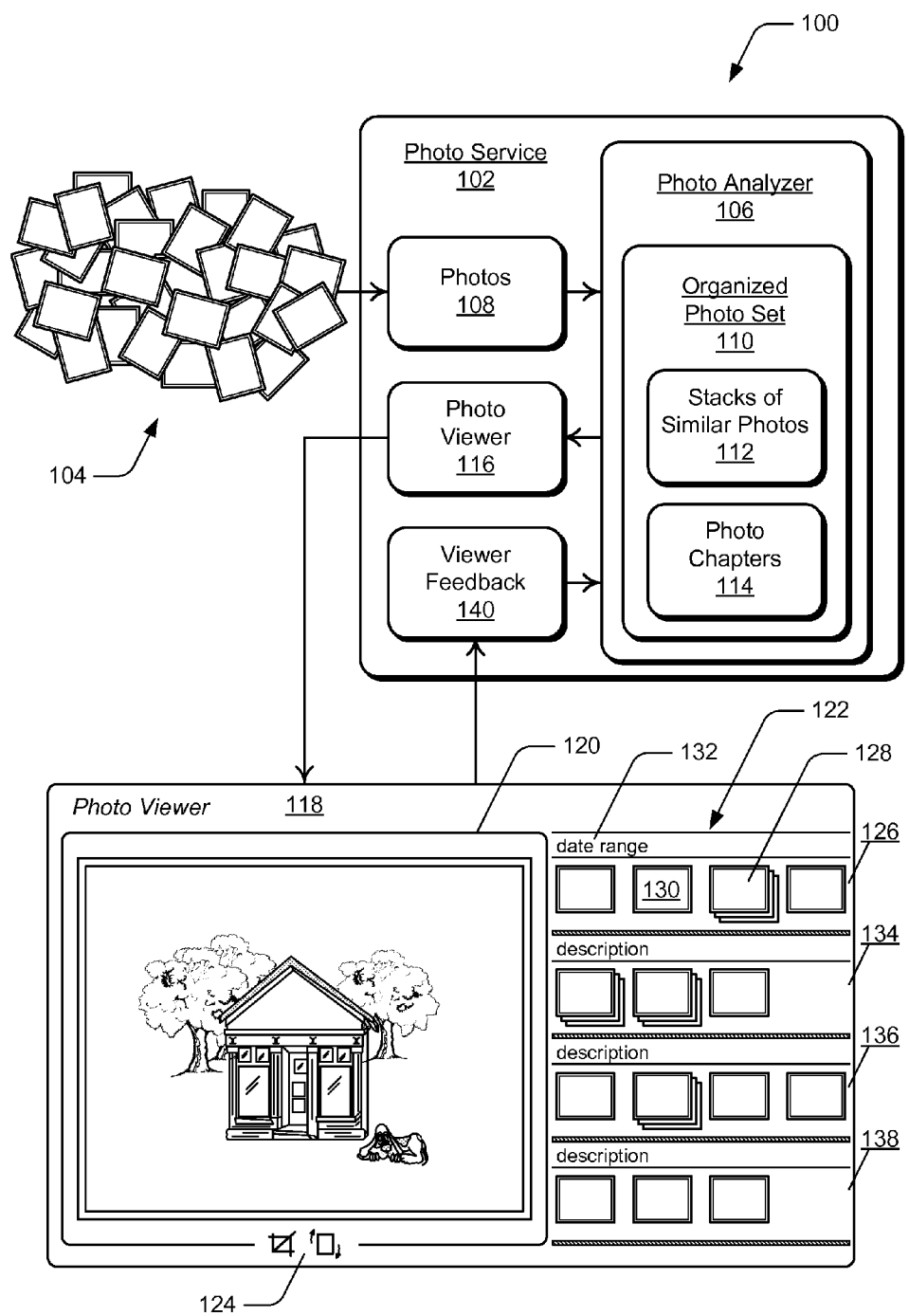
FIG. 1 illustrates an example of photo importance determination in accordance with one or more embodiments.

FIG. 1 illustrates an example 100 of photo importance determination in accordance with one or more embodiments. The example 100 includes a photo service 102, such as a network service that a user can access via a client device, to organize a large group of photos 104 that are uploaded to the photo service. The photos described herein are digital photos that include image content. A photo "taken" generally refers to a user composing and taking a photo with a digital camera device, whereas a photo "captured" generally refers to the processing performed by the digital camera device to image the photo that the user has taken. The digital photos can also include associated metadata of the photos, such as exchangeable image file format (EXIF) photo data that includes a timestamp (e.g., date and time), and location data corresponding to when and where a photo is taken or captured.

The photo service 102 includes a photo analyzer 106 that can be implemented as a software application for photo analysis to organize and determine photo importance given a set of photos 108. The photo analyzer 106 can be maintained at the photo service 102 as executable instructions that are stored on computer-readable storage media, such as any suitable memory device or electronic data storage. Additionally, the photo analyzer can be executed with a processing system at the photo service to implement embodiments of photo importance determination. Further, the photo service can be implemented with various components, such as a processing system and memory, as well as any number and combination of differing components as further described with reference to the example device shown in FIG. 7.

A user of the photo service 102 can select the group of photos 104 that are uploaded as the set of photos 108 to be analyzed by the photo analyzer 106 for photo importance determination and shared with others, who are referred to herein as the viewers of the shared, organized photos. The user who selects the photos to be analyzed and shared may also be referred to as the photo owner of the set of photos. Generally, the user's group of photos 104 may include hundreds, or even thousands, of digital photos that would be particularly time-consuming for the user to sort through and organize for sharing. However, the techniques described for photo importance determination may also be implemented for a relatively small set of digital photos.

Rather than manually selecting individual photos, the user can select the digital photos to include in the shared group of photos 104 based on a date range that encompasses the group of photos, such as in a calendar view that indicates the number of photos within a date range, or that displays thumbnail images associated with calendar dates. For example, the user may simply select the first through the end of a month to share all of the photos that were taken during the month. The user may also select one photo from the group of photos to represent the entire set of selected photos for sharing. Although not needed to utilize the photo analyzer 106 at the photo service 102, the user may also pre-sort larger subgroups of the photos, such as by people, places, or events before initiating the photo analyzer.

Additionally, the user may select the viewers with whom to share the selected group of photos 104 from an address book, contacts list, social network site, and the like. The photo service 102 can receive a list of user-selected viewers from a user, such as via a user client device, and communicate invitations to view an organized photo set 110 based on viewer contact information, such as in an email or text message. The photo service can then distribute the organized photo set to a viewer client device when a viewer accepts an invitation and/or requests the photos for display and viewing at the client device.

In embodiments, the photo analyzer 106 is implemented to generate the organized photo set 110 from the set of photos 108, and the organized photo set can include stacks of similar photos 112 and/or photo chapters 114. In implementations, the photo analyzer first determines the similar photos in the entire set of photos to create the stacks of similar photos, and then organizes the stacked photos and non-stacked photos into the photo chapters, without allocating a stack of similar photos to more than one chapter (e.g., the similar photos in a stack are maintained together in a single photo chapter). This implementation is further described with reference to FIG. 5. In alternate implementations, the photo analyzer first organizes the set of photos into the photo chapters, and then determines similar photos within each chapter to create the stacks of similar photos in each respective photo chapter. This implementation is further described with reference to FIG. 6.

The photo analyzer 106 can organize the set of photos 108 into a chronological hierarchical structure of the photo chapters 114 (to include sub-chapters), where each chapter includes a subset of the digital photos. The photo chapters can be organized based on a timestamp of each photo and time gaps between the subsets of the photos. The end of one chapter and the beginning of a next chapter can be based on the detection of larger gaps of time between the photos, or collectively, the stacks of similar photos. The photo chapters can also be based on the number of photos in the set of photos 108 and/or based on a user selected target number of chapters. For example, the user may simply select a date range from the first through the end of a month to share all of the photos that were taken during the month. The user may then designate four photo chapters that correspond to a sequence of events during the selected month, such as a family vacation that includes photos taken over several days, a birthday party, and a couple of the kids' sporting events.

In embodiments, the photo analyzer 106 is implemented to analyze the image content of each digital photo in the set of photos 108, and determine the similar photos based on the image content and metadata of the photos. The photo analyzer can then create the stacks of similar photos 112 from these determined similar photos. The photo image content of each digital photo that is analyzed can include object recognition, facial recognition if a photo includes one or more faces of people, the number of faces in a photo, and/or facial composition, such as to detect for open eyes, smiles, and mouths closed (e.g., other than the smiles). The photo image content can also be analyzed for image focus (e.g., whether a photo is blurry or sharp), colors and lighting, and other environment factors, such as the relative horizon level of the image content in a photo.

The photo analyzer 106 can utilize a photo importance formula that is implemented as a function of various image content factors to determine the similar photos from the set of photos 108. Optionally, the image content factors may be user-selectable for photo importance determination. In embodiments, the function of the photo importance formula can include any one or combination of image content factors, and may be expressed as: f [(object recognition) (facial recognition) (face count) (eyes open) (mouths closed) (smile) (image focus) (exposure) (horizon level) (image content analysis) (image content comparison) (user preferences) (photo metadata) (viewer feedback) (photo selection) (photo display duration) (viewer preferences)].

The image content factors of the function for a photo importance formula can be selected and modified, such as to weight and determine the image content factors that are more important to generate the organized photo set 110. For example, image focus (also referred to as the blurriness of a photo) may have more effect on reducing the importance determination of a photo. Similarly, recognizing that a person or people in a photo have their eyes open may have more effect on increasing the importance determination of a photo.

The photo analyzer 106 is also implemented to determine the stacks of similar photos 112 based on the photos 108 that are nearly duplicate images of the same subject, such as photos that are often taken in relatively quick succession and/or in the same location. For example, a user may want to take three or four photos of a group of people in the hopes that everyone in the photo will be smiling and looking at the camera in at least one of the photos. Similarly, a user may take several photos of particular subject, such as a sunset, over several minutes to capture the one ideal sunset photo. If several photos are taken a few seconds apart or at the same location, then one of the photos is likely important. Additionally, photos of the same person or group of people can be stacked to avoid initially displaying more than one photo of the same person or group.

The photo analyzer 106 can utilize an implementation of the photo importance formula to determine the stacks of similar photos 112, where the importance formula is implemented as a function of the image content factors that include: f [(object recognition) (facial recognition) (similar image content) (image focus)]. For example, several of the photos may include a group of people gathered together. These similar photos can all be grouped in a stack of similar photos, and then one of these photos can be determined as the representative photo of the stack.

The photo analyzer 106 is implemented to utilize an implementation of the photo importance formula to determine the representative photo from the similar photos in each of the stacks of similar photos 112. The importance formula can be implemented as a function of the image content factors that include: f [(object recognition) (facial recognition) (eyes open) (mouths closed) (smile) (image focus) (horizon level) (exposure) (photo metadata)]. If the photos in a stack of similar photos include faces of people (e.g., as determined by facial recognition), the representative photo for the stack can be based on the number of faces in the photos, as well as the image content analyzed to detect for eyes open, smiles, and mouths closed (e.g., other than the smiles). Additionally, the percentage of image area in a photo that includes a face or faces can be taken into consideration, as well as the distance to the one or more faces in a photo. For example, a close up photo of a person or a group of people is likely of greater importance than if the people in a photo are farther away.

The photo analyzer 106 is also implemented to determine the organized photo set 110 as a display sequence to display non-stacked photos and the representative photos of each stack, such as displayed in a photo viewer interface at a viewer client device. The photo analyzer can utilize an implementation of the photo importance formula to determine the display sequence of the non-stacked photos and the representative photos. The importance formula can be implemented as a function of the image content factors that include: f [(object recognition) (facial recognition) (eyes open) (mouths closed) (smile) (image focus) (horizon level) (exposure) (photo metadata) (# of photos in a stack)]. In this instance, the importance formula is also based on the number of similar photos in a stack, which increases the importance of a stack of similar photos and the representative photo of the stack.

In this example 100 of photo importance determination, the photo service 102 includes a photo viewer 116 that supports displaying the photos for viewing, such as when downloaded to a client device. The photo viewer can be implemented as a software application and maintained at the photo service as executable instructions that are stored on computer-readable storage media. The photo service can provide the photo viewer, along with the organized photo set 110, to a viewer client device when a viewer requests the photos for display and viewing. The photo viewer includes a photo viewer interface 118 to display the digital photos in the organized photo set.

The photo viewer interface 118 has a photo display region 120 and a photo chapters region 122. The photo viewer interface may also include any type of user-selectable photo edit controls 124, or other types of user interface function controls, such as to share or annotate the photos. The organized photo set 110 is displayed segmented by the photo chapters with the most important photos displayed at the beginning of each chapter, where a chapter includes non-stacked photos and stacks of similar photos with a representative photo of the stack displayed on top. In this example, the organized photo set 110 includes four photo chapters 114, which are displayed in the photo chapters region 122 of the photo viewer interface. A first photo chapter 126 includes a stack of similar photos 128, as well as several non-stacked photos 130 that are displayed as thumbnail images.

A viewer can select any of the thumbnail images that are displayed in the photo chapters region 122 to display a selected photo in the photo display region 120 of the photo viewer interface 118. A viewer can also easily navigate between the photo chapters and view as many or as few of the photos in each chapter, and the viewer will be able to see the determined important photos even if only a small subset of the photos are viewed. A viewer may also create his or her own collection of photos from the organized photo set. For example, a viewer may select a couple of the photo chapters and then initiate the photo analyzer 106 at the photo service 102 to re-organize the photos based on just the photos that are included in the selected chapters.

The photo chapters in the photo chapters region 122 of the photo viewer interface 118 also include an associated chapter identifier, such as the chapter identifier 132 that is associated with the first photo chapter 126. The chapter identifiers initially default to dates and times based on the earliest photo that is included in a chapter. However, a user may change a chapter identifier to a text description that identifies the subset of photos in a particular chapter. For example, the chapter identifier 132 of the first photo chapter may be displayed as a date range, whereas the chapter identifier of a second photo chapter 134 is displayed as a text description of the chapter. Similarly, the chapter identifiers associated with each of a third photo chapter 136 and a fourth photo chapter 138 are displayed as a text description of the respective chapters.

The photo service 102 can receive viewer feedback 140 as feedback data associated with the digital photos displayed for viewing at various client devices. The viewer feedback data can include identifiers of the photos selected for viewing, photo display durations of the selected photos, viewer preferences for the selected photos, and viewer photo approval. The photo display durations of the selected photos may indicate how long a viewer looks at the particular displayed photos and the number of times that a particular photo is selected for viewing. The importance of the photos can be adjusted based on the viewer feedback. For example, the photos that are selected for viewing, as compared to the displayed thumbnail images that can be selected by a viewer, indicate viewer preferences. A viewer selection of a particular photo can influence the importance of both the viewed and bypassed photos, thereby improving the importance determination of the photos. A viewer may also increase the importance of a photo if the viewer zooms and/or pans the photo for better viewing. If a viewer "likes" a photo, otherwise rates or indicates approval of the photo, adds the photo to another collection of photos (e.g., a personal collection of photos), or prints and/or downloads the photo, then the importance of the photo may also be increased.

In embodiments, the photo analyzer 106 at the photo service 102 is implemented to utilize the viewer feedback 140 to determine different representative photos for the stacks of similar photos 112. The photo analyzer 106 can determine the representative photos for the stacks of similar photos utilizing the photo importance formula implemented as a function of the image content factors that include viewer feedback: f [(object recognition) (facial recognition) (eyes open) (mouths closed) (smile) (image focus) (horizon level) (exposure) (photo metadata) (photo selection) (photo display duration) (viewer preferences)].

A photo importance determination may also include aspects of recognized faces in conjunction with determined viewer interest in particular photos that include the recognized faces. Viewer preferences for photos that include facially identifiable people can be identified to improve future viewing experiences for the viewer. For example, if the organized photo set is sent to several others for viewing, the photo importance determinations can be re-determined after each person views the photo set to generate an updated photo viewing experience for the viewers (e.g., because the photos can change each time based on viewer detected feedback).

The photo analyzer can also utilize the viewer feedback to determine a revised display sequence of the non-stacked photos and the representative photos of the stacks of similar photos in each of the respective photo chapters 114. The photo analyzer can determine the display sequence utilizing the photo importance formula implemented as a function of the image content factors that include viewer feedback: f [(object recognition) (facial recognition) (eyes open) (mouths closed) (smile) (image focus) (horizon level) (exposure) (photo metadata) (# of photos in a stack) (photo selection) (photo display duration) (viewer preferences)].

Figure 2:
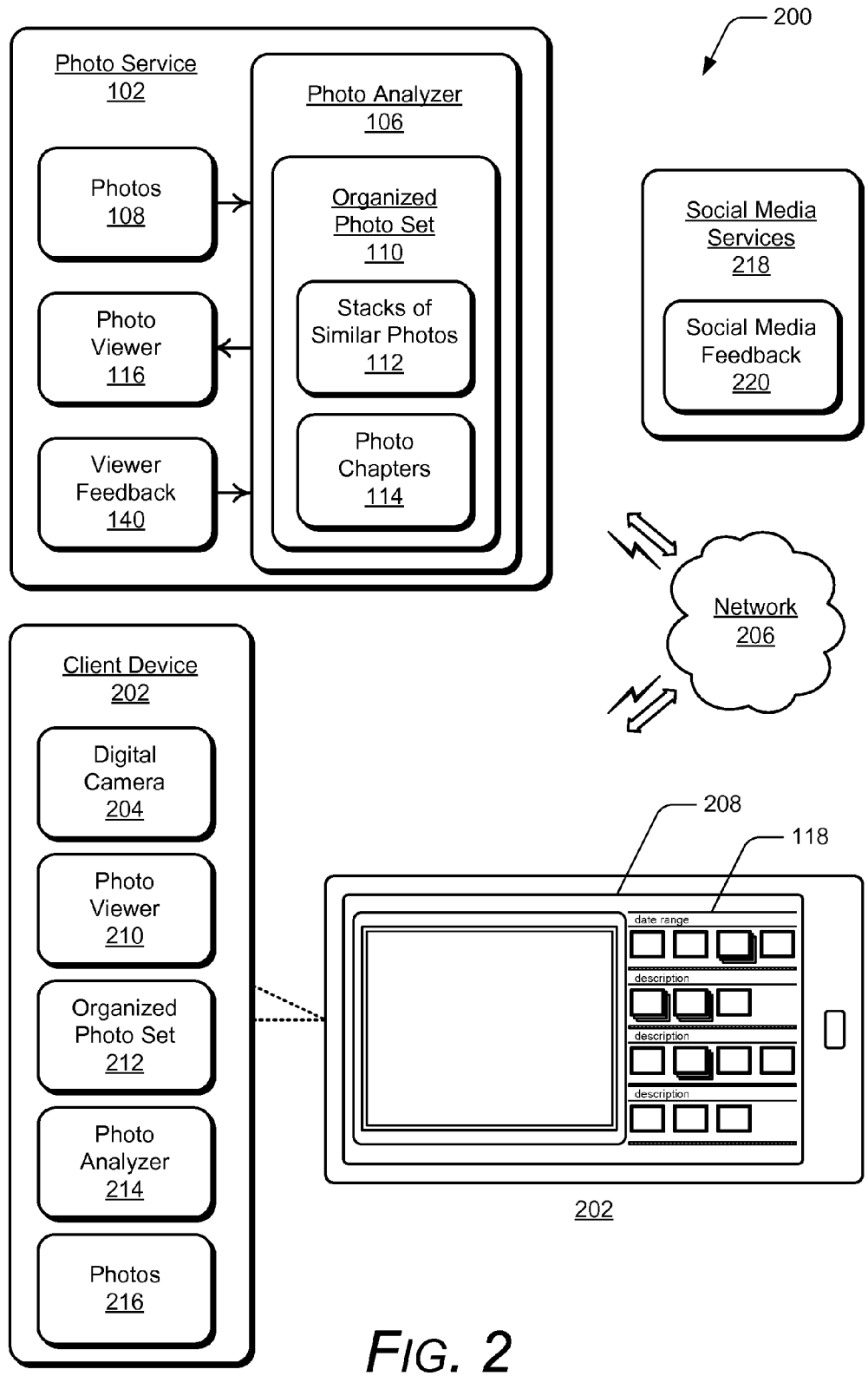
FIG. 2 illustrates an example system in which embodiments of photo importance determination can be implemented.

FIG. 2 illustrates an example system 200 in which embodiments of photo importance determination can be implemented. The system 200 includes the photo service 102 as described with reference to FIG. 1. The example system 200 also includes an example client device 202 in which embodiments of photo importance determination can be implemented. The example client device may be any one or combination of a wired or wireless device, such as a mobile phone, tablet, computing, communication, entertainment, gaming, media playback, and/or other type of device. Any of the devices can be implemented with various components, such as a processing system and memory, an integrated digital camera 204 to capture digital photos, and any number and combination of differing components as further described with reference to the example device shown in FIG. 7.

Any of the devices and services described herein can communicate via a network 206, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In this example, the client device 202 includes an integrated display device 208 to display the photo viewer interface 118 as described with reference to FIG. 1. The client device 202 may receive the photo viewer 116 from the photo service 102, or include a standalone photo viewer 210 that supports displaying the photos. The photo service 102 can communicate the organized photo set 110 to the client device 202, which maintains a version of the organized photo set 212 for viewing.

The client device 202 may implement a component or module of the photo analyzer 106 and/or can implement a standalone version of the photo analyzer 214 to implement embodiments of photo importance determination as described with reference to the photo analyzer 106 at the photo service 102. For example, a user of the client device 202 may want to organize a set of photos 216 that are maintained on the device, and the user can initiate the photo analyzer 214 for photo analysis to organize and determine photo importance given the set of photos. The user may have taken hundreds or thousands of photos over the course of year, and wants to share just the photos of the kids from the past year with a relative who is most interested in photos of the kids within any date range and for any event. The user can initiate the photo analyzer 214 at the client device (or the photo analyzer 106 at the photo service 102) to quickly organize and separate all of the photos of the kids, and then just share this group of photos with the relative.

In another example, the user may want to share photos of a vacation on the client device 202 with a co-worker who is interested in the vacation spot, but not necessarily interested in all of the photos 216 on the client device. The user can initiate the photo analyzer 214 at the client device to quickly separate all of the scenic vacation photos from the entire set of photos, and then hand the device to the co-worker who can view the organized photo set of generally just the vacation spot.

In other implementations, the example system 200 can include any type of social media services 218 through which the photos can be shared and viewed by social media members. The photo service 102 can receive social media feedback 220 as part of the viewer feedback 140 from viewers at any of the social media services, such as "likes" or other indications from viewers that particular photos have more importance over others.

Figure 3:
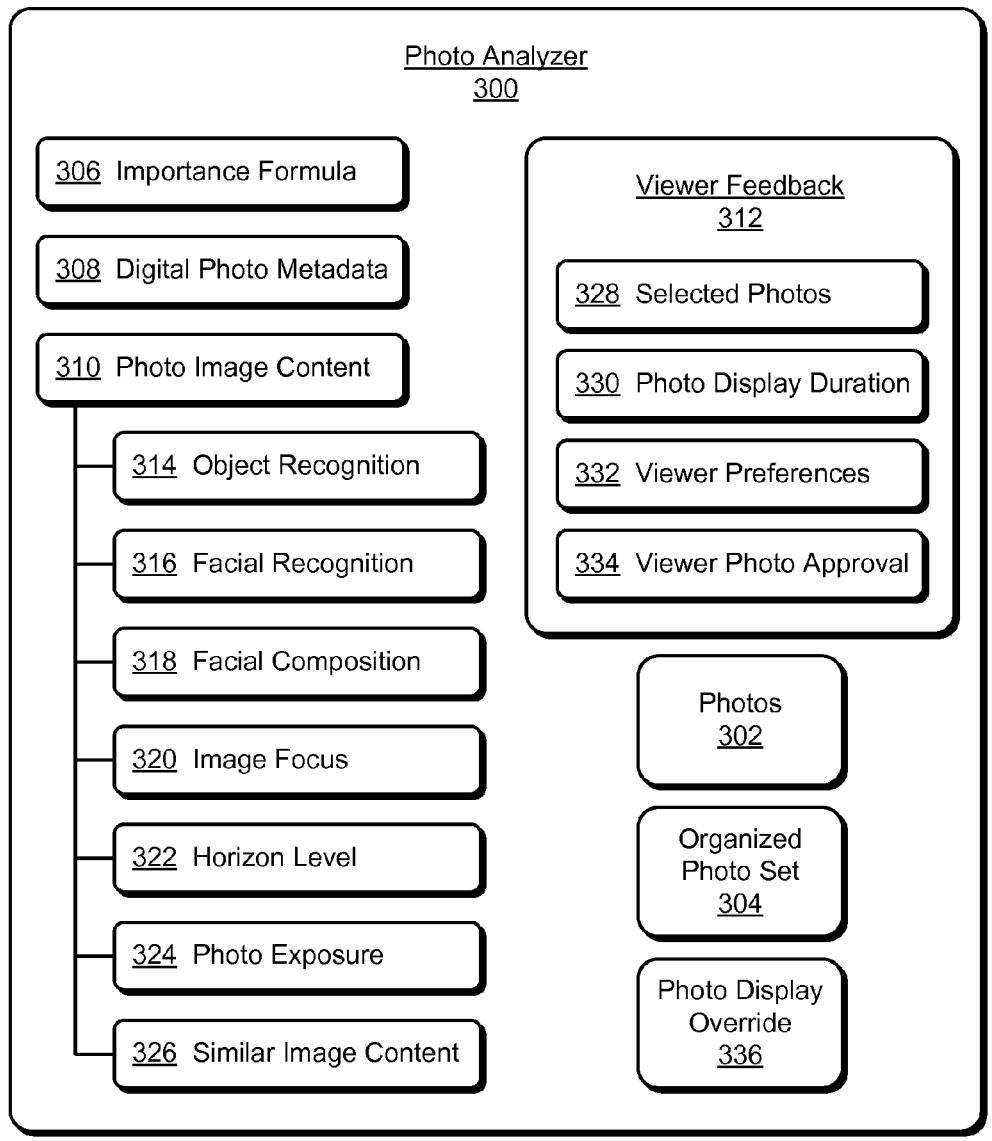
FIG. 3 illustrates an example photo analyzer that can implement photo importance determination in accordance with one or more embodiments.

FIG. 3 illustrates an example photo analyzer 300 as described with reference to FIGS. 1 and 2, such as the photo analyzer 106 implemented at the photo service 102 and/or the photo analyzer 214 implemented by the client device 202. As described, the photo analyzer 300 receives a set of photos 302 for photo analysis, and can then organize and determine photo importance given the set of photos to generate an organized photo set 304. The photo analyzer utilizes a photo importance formula 306 that is implemented as a function of various image content factors of photo importance determination, and any one or combination of the image content factors can be used depending on the determination. The image content factors can include digital photo metadata 308, photo image content 310, and/or viewer feedback 312.

The photo image content 310 can include object recognition 314 of objects in the photos, facial recognition 316 of a face or faces in the photos, and facial composition 318 of the faces in the photos. The facial composition of the image content in a photo can include the number of faces in the photo, and whether eyes are open, mouths are closed, and people are smiling. The image content factors can also include image focus 320 (e.g., the blurriness of a photo), the horizon level 322 (e.g., the relative horizon level of the image content in a photo), photo exposure 324 (e.g., colors and lighting in a photo), and similar image content 326 as determined by image content comparison and analysis.

The viewer feedback 312 can include identifiers of selected photos 328 that viewers select to view, print, download, and/or add to another photo collection. The viewer feedback can also include photo display durations 330 of the selected photos that indicates how long a viewer looks at the particular displayed photos and the number of times that a particular photo is selected for viewing. The viewer feedback can also include viewer preferences 332 and viewer photo approval 334, such as when a social media viewer "likes" a photo, or otherwise rates or indicates approval of the photo.

In embodiments, the photo analyzer 300 may also include photo display override 336 features so that a user can override the representative photos that are determined for the stacks of similar photos, and/or override and adjust the display sequence of the photos as determined by the photo analyzer. For example, the user may be a professional photographer, or artist, preferring to display a blurry photo or a photo of a person sleeping (e.g., with his or her eyes closed). The user may also override other image content factors of photo importance determination.

Example methods 400, 500, and 600 are described with reference to respective FIGS. 4-6 in accordance with one or more embodiments of photo importance determination. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 4:
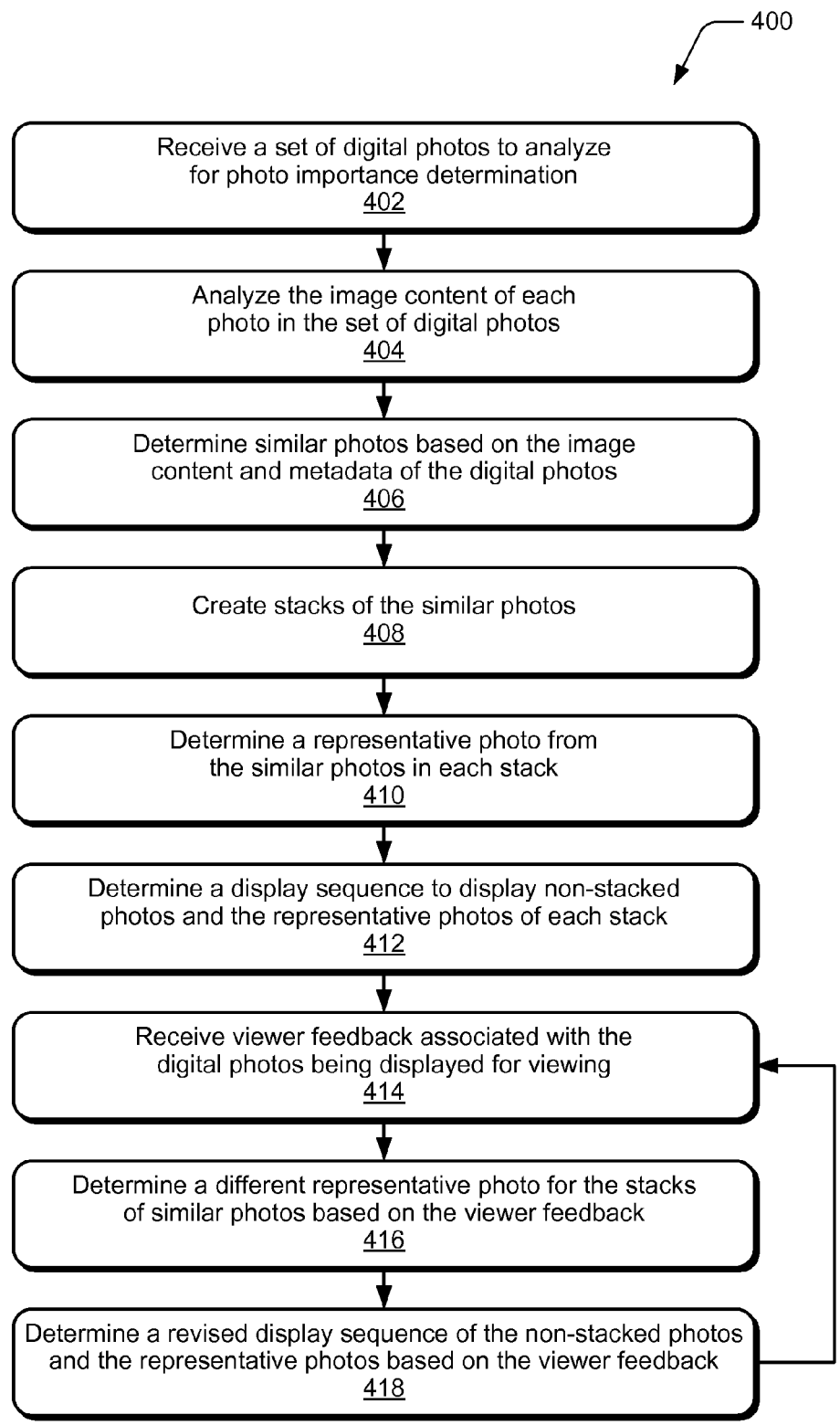
FIG. 4 illustrates example method(s) of photo importance determination in accordance with one or more embodiments.

FIG. 4 illustrates example method(s) 400 of photo importance determination, and is generally described with reference to a photo analyzer. The order in which the method is described is not intended to be construed as a limitation, and any number or combination of the method operations can be combined in any order to implement a method, or an alternate method.

At 402, a set of digital photos are received to analyze for photo importance determination. For example, the photo analyzer 106 at the photo service 102 (FIG. 1) receives the set of photos 108 to analyze for photo importance determination. Similarly, the client device 202 (FIG. 2) implements the photo analyzer 214 to analyze the set of photos 216 for photo importance determination.

At 404, the image content of each photo in the set of digital photos is analyzed. For example, the photo analyzer 106 at the photo service 102 analyzes the image content of each photo in the set of photos 108, and the analysis can be based on object recognition, facial recognition, and/or facial composition. Similarly, the photo analyzer 214 at the client device 202 analyzes the image content of each photo in the set of photos 216 that are maintained on the client device.

At 406, similar photos are determined based on the image content and metadata of the digital photos. For example, the photo analyzer 106 at the photo service 102 determines similar photos based on the image content (determined at 404) and based on metadata of the photos 108. Similarly, the photo analyzer 214 at the client device 202 determines similar photos based on the image content and metadata of the photos 216.

At 408, stacks of the similar photos are created. For example, the photo analyzer 106 at the photo service 102 creates the stacks of similar photos 112 based on the determination of similar photos (at 406). Similarly, the photo analyzer 214 at the client device 202 creates stacks of similar photos based on determined similar photos in the set of photos 216.

At 410, a representative photo is determined from the similar photos in each stack. For example, the photo analyzer 106 at the photo service 102 utilizes an implementation of the photo importance formula 306 (FIG. 3) that is a function of image content factors to determine a representative photo from the similar photos in each of the stacks of similar photos 112. Similarly, the photo analyzer 214 at the client device 202 utilizes an implementation of the photo importance formula to determine a representative photo for each stack of similar photos.

At 412, a display sequence to display non-stacked photos and the representative photos of each stack is determined. For example, the photo analyzer 106 at the photo service 102 utilizes an implementation of the photo importance formula 306 that is a function of image content factors and a quantity of the similar photos in each of the stacks of similar photos to determine a display sequence of the non-stacked and representative photos (e.g., as the organized photo set 110). Similarly, the photo analyzer 214 at the client device 202 utilizes an implementation of the photo importance formula to determine a display sequence of the non-stacked and representative photos.

At 414, viewer feedback associated with the digital photos being displayed for viewing is received. For example, the photo analyzer 106 at the photo service 102 receives the viewer feedback 140, which can include identifiers of the photos that are selected for viewing, photo display durations of the selected photos, viewer preferences for the selected photos, and/or as viewer photo approval. Similarly, the photo analyzer 214 at the client device 202 receives viewer feedback associated with the photos 216 being displayed for viewing at the client device.

At 416, a different representative photo from the similar photos in the stacks of similar photos is determined based on the viewer feedback. For example, the photo analyzer 106 at the photo service 102 utilizes an implementation of the photo importance formula 306 that is a function of image content factors and the viewer feedback (received at 414) to determine a different representative photo from the similar photos in each of the stacks of similar photos 112. Similarly, the photo analyzer 214 at the client device 202 utilizes an implementation of the photo importance formula (including the viewer feedback) to determine a different representative photo for each stack of similar photos.

At 418, a revised display sequence of the non-stacked photos and the representative photos is determined based on the viewer feedback. For example, the photo analyzer 106 at the photo service 102 utilizes an implementation of the photo importance formula 306 that is a function of image content factors and the viewer feedback (received at 414) to determine a revised display sequence of the non-stacked and representative photos (e.g., as the organized photo set 110). Similarly, the photo analyzer 214 at the client device 202 utilizes an implementation of the photo importance formula (including the viewer feedback) to determine a revised display sequence of the non-stacked and representative photos. The method then continues at 414 to receive viewer feedback associated with the digital photos being displayed for viewing.

Figure 5:
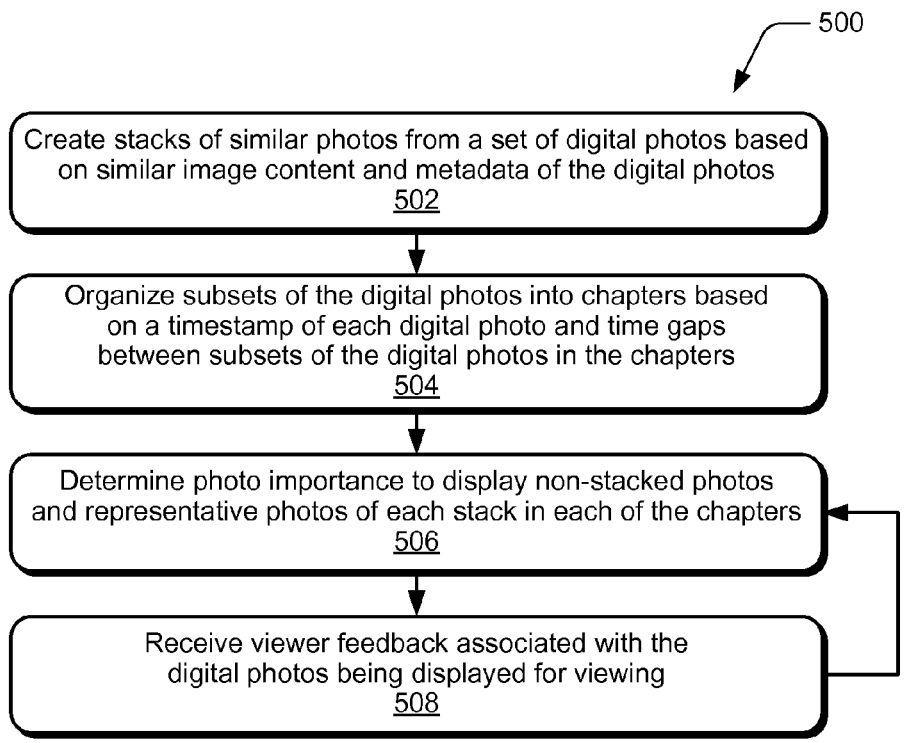
FIG. 5 illustrates example method(s) of photo importance determination in accordance with one or more embodiments.

FIG. 5 illustrates example method(s) 500 of photo importance determination, and is generally described with reference to a photo analyzer. The order in which the method is described is not intended to be construed as a limitation, and any number or combination of the method operations can be combined in any order to implement a method, or an alternate method.

At 502, stacks of similar photos from a set of digital photos are created based on similar image content and metadata of the digital photos. For example, the photo analyzer 106 at the photo service 102 (FIG. 1) creates the stacks of similar photos 112 based on similar image content and metadata of the photos in the set of photos 108.

At 504, subsets of the digital photos are organized into chapters based on a timestamp of each digital photo and time gaps between the subsets of the digital photos in the chapters. For example, the photo analyzer 106 at the photo service 102 organizes subsets of the photos 108 along with the stacks of similar photos 112 into the photo chapters 114, where each photo chapter includes a subset of the digital photos, and the photo chapters are organized based on a timestamp of each digital photo and time gaps between the subsets of the digital photos. In implementations, the photo analyzer 106 first determines the similar photos in the entire set of photos 108 to create the stacks of similar photos 112 (at 502), and then organizes the stacked photos and non-stacked photos into the photo chapters (at 504). The photo chapters are organized without allocating a stack of similar photos to more than one chapter (e.g., the similar photos in a stack are maintained together in a single photo chapter).

At 506, photo importance is determined to display non-stacked photos and the representative photos of each stack in each of the chapters. For example, the photo analyzer 106 at the photo service 102 utilizes an implementation of the photo importance formula 306 (FIG. 3) that is a function of image content factors to determine photo importance of the non-stacked and representative photos of the stacks of similar photos 112 for display in each of the photo chapters 114.

At 508, viewer feedback associated with the digital photos being displayed for viewing is received. For example, the photo analyzer 106 at the photo service 102 receives the viewer feedback 140 that is associated with the photos being displayed for viewing. The method then continues at 506 to revise the photo importance determinations based on the viewer feedback (received at 508).

Figure 6:
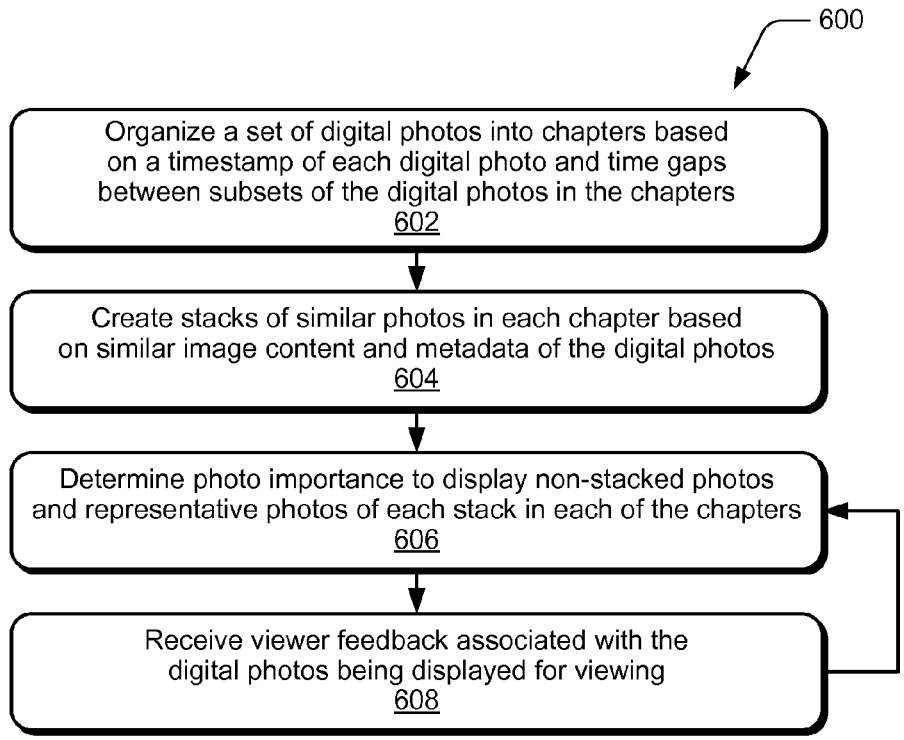
FIG. 6 illustrates example method(s) of photo importance determination in accordance with one or more embodiments.

FIG. 6 illustrates example method(s) 600 of photo importance determination, and is generally described with reference to a photo analyzer. The order in which the method is described is not intended to be construed as a limitation, and any number or combination of the method operations can be combined in any order to implement a method, or an alternate method.

At 602, a set of digital photos is organized into chapters based on a timestamp of each digital photo and time gaps between the subsets of the digital photos in the chapters. For example, the photo analyzer 106 at the photo service 102 (FIG. 1) organizes the set of photos 108 into the photo chapters 114, where each photo chapter includes a subset of the digital photos, and the photo chapters are organized based on a timestamp of each digital photo and time gaps between the subsets of the digital photos.

At 604, stacks of similar photos in each chapter are created based on similar image content and metadata of the digital photos. For example, the photo analyzer 106 at the photo service 102 creates the stacks of similar photos 112 in each of the photo chapters 114 based on similar image content and metadata of the photo subsets in the photo chapters. In implementations, the photo analyzer first organizes the set of photos into the photo chapters (at 602), and then determines similar photos within each chapter to create the stacks of similar photos in each respective photo chapter (at 604).

At 606, photo importance is determined to display non-stacked photos and the representative photos of each stack in each of the chapters. For example, the photo analyzer 106 at the photo service 102 utilizes an implementation of the photo importance formula 306 (FIG. 3) that is a function of image content factors to determine photo importance of the non-stacked and representative photos of the stacks of similar photos 112 for display in each of the photo chapters 114.

At 608, viewer feedback associated with the digital photos being displayed for viewing is received. For example, the photo analyzer 106 at the photo service 102 receives the viewer feedback 140 that is associated with the photos being displayed for viewing. The method then continues at 606 to revise the photo importance determinations based on the viewer feedback (received at 608).

Figure 7:
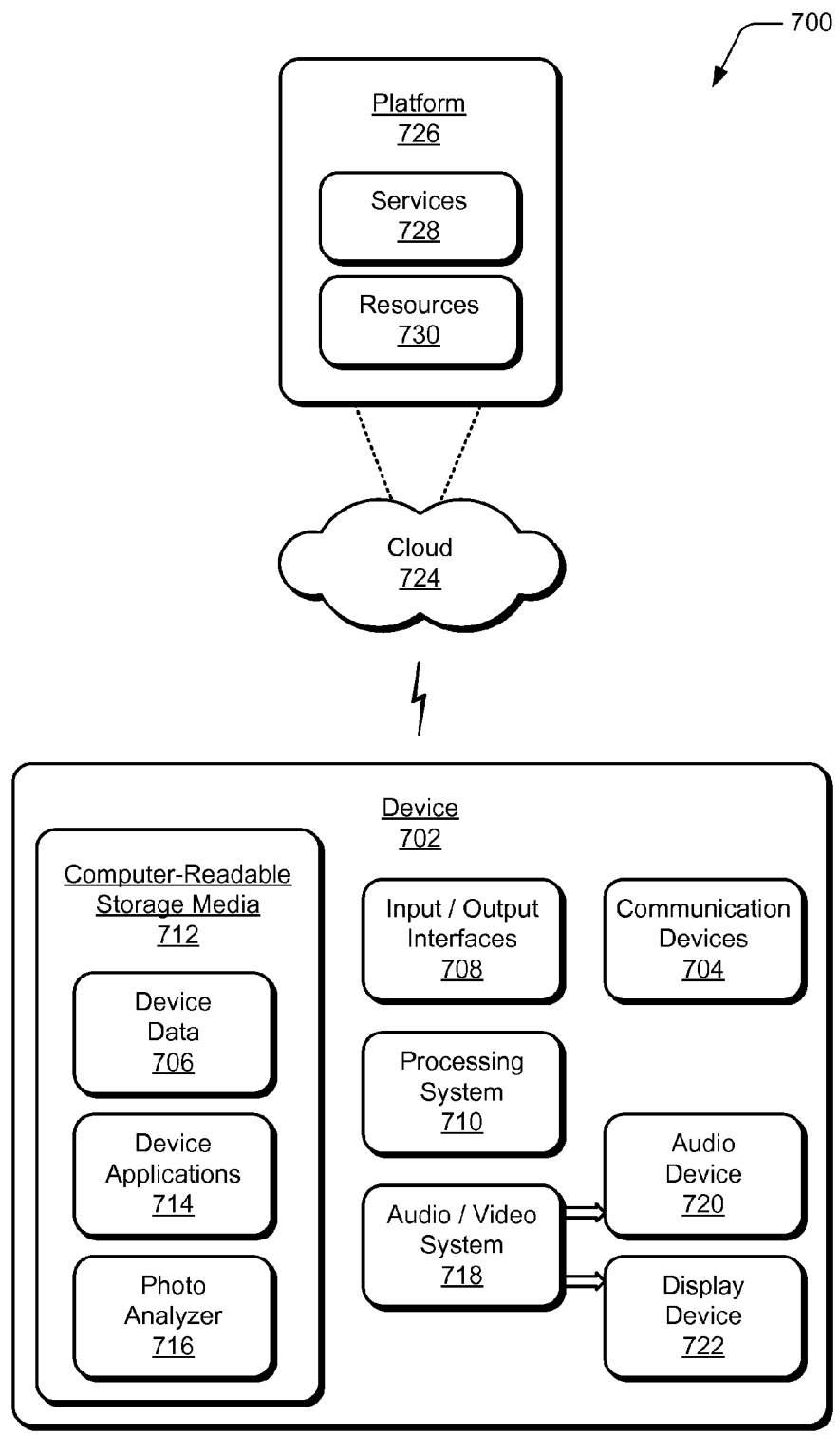
FIG. 7 illustrates an example system with an example device that can implement embodiments of photo importance determination.

FIG. 7 illustrates an example system 700 that includes an example device 702, which can implement embodiments of photo importance determination. The example device 702 can be implemented as any of the devices and/or services (e.g., server devices) described with reference to the previous FIGS. 1-6, such as any type of client device, mobile phone, tablet, computing, communication, entertainment, gaming, media playback, and/or other type of device. For example, the photo service 102 and/or the client device 202 shown in FIGS. 1 and 2 may be implemented as the example device 702.

The device 702 includes communication devices 704 that enable wired and/or wireless communication of device data 706, such as sets of photos, organized photo sets, and the viewer feedback that is collected and stored on the device. The device data can include any type of audio, video, and/or image data, as well as collected data. The communication devices 704 can also include transceivers for cellular phone communication and/or for network data communication.

The device 702 also includes input/output (I/O) interfaces 708, such as data network interfaces that provide connection and/or communication links between the device, data networks, and other devices. The I/O interfaces can be used to couple the device to any type of components, peripherals, and/or accessory devices, such as a digital camera device that may be integrated with device 702. The I/O interfaces also include data input ports via which any type of data, media content, and/or inputs can be received, such as user inputs to the device, as well as any type of audio, video, and/or image data received from any content and/or data source.

The device 702 includes a processing system 710 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The device 702 also includes computer-readable storage media 712, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 712 provides storage of the device data 706 and various device applications 714, such as an operating system that is maintained as a software application with the computer-readable storage media and executed by the processing system 710. In this example, the device applications also include a photo analyzer 716 that implements embodiments of photo importance determination, such as when the example device 702 is implemented as the client device 202 shown in FIG. 2. Examples of the photo analyzer 716 include the photo analyzer 106 implemented at the photo service 102, the photo analyzer 214 implemented by the client device 202, and/or the photo analyzer 300, as described with reference to FIGS. 1-3.

The device 702 also includes an audio and/or video system 718 that generates audio data for an audio device 720 and/or generates display data for a display device 722. The audio device and/or the display device include any devices that process, display, and/or otherwise render audio, video, display, and/or image data, such as the image content of a digital photo. In implementations, the audio device and/or the display device are integrated components of the example device 702. Alternatively, the audio device and/or the display device are external, peripheral components to the example device.

In embodiments, at least part of the techniques described for photo importance determination may be implemented in a distributed system, such as over a "cloud" 724 in a platform 726. The cloud 724 includes and/or is representative of the platform 726 for services 728 and/or resources 730. For example, the services 728 may include the photo service 102 described with reference to FIGS. 1 and 2. Additionally, the resources 730 may include the photo analyzer 106 that is implemented at the photo service as described with reference to FIGS. 1 and 2.

The platform 726 abstracts underlying functionality of hardware, such as server devices (e.g., included in the services 728) and/or software resources (e.g., included as the resources 730), and connects the example device 702 with other devices, servers, etc. The resources 730 may also include applications and/or data that can be utilized while computer processing is executed on servers that are remote from the example device 702. Additionally, the services 728 and/or the resources 730 may facilitate subscriber network services, such as over the Internet, a cellular network, or Wi-Fi network. The platform 726 may also serve to abstract and scale resources to service a demand for the resources 730 that are implemented via the platform, such as in an interconnected device embodiment with functionality distributed throughout the system 700. For example, the functionality may be implemented in part at the example device 702 as well as via the platform 726 that abstracts the functionality of the cloud 724.

Although embodiments of photo importance determination have been described in language specific to features and/or methods, the appended claims are not necessarily limited to the specific features or methods described. Rather, the specific features and methods are disclosed as example implementations of photo importance determination.

The invention claimed is:

1. A computing system, comprising:
 a display device configured to display a photo viewer interface that displays a set of digital photos organized for viewing;
 a processing system to implement a photo analyzer that is configured to:
  analyze image content of each photo in the set of digital photos;
  determine similar photos in the set of digital photos based on the image content and at least location-based metadata of the digital photos;
  create stacks of the similar photos;
  determine a representative photo from the similar photos in each stack;
 and
  determine a display sequence to display non-stacked photos and the representative photos of each stack in the photo viewer interface.

2. A computing system as recited in claim 1, wherein the photo analyzer is configured to:
 receive viewer feedback associated with the digital photos displayed for viewing; and
 determine a revised display sequence of the non-stacked photos and the representative photos based on the viewer feedback.

3. A computing system as recited in claim 2, wherein the photo analyzer is configured to determine a different representative photo from the similar photos in a stack based on the viewer feedback.

4. A computing system as recited in claim 1, wherein the photo analyzer is configured to determine the representative photo from the similar photos in a stack based on a photo importance formula that is a function of image content factors, to include the image content, photo metadata, and viewer feedback.

5. A computing system as recited in claim 1, wherein the photo analyzer is configured to determine the display sequence of the non-stacked photos and the representative photos based on a photo importance formula that is a function of image content factors and a quantity of the similar photos in each of the stacks of similar photos.

6. A computing system as recited in claim 1, wherein the photo analyzer is configured to organize the set of digital photos into chapters, wherein each chapter includes a subset of the digital photos, and the chapters are determined based on a timestamp of each digital photo and time gaps between the subsets of the digital photos.

7. A method, comprising:
executing a photo analyzer on a processor of a computing device to perform:
analyzing image content of each photo in a set of digital photos;
determining similar photos in the set of digital photos based on the image content and metadata of the digital photos;
creating stacks of the similar photos;
determining a representative photo from the similar photos in each stack; and
determining a display sequence to display non-stacked photos and the representative photos of each stack.

8. A method as recited in claim 7, further comprising:
receiving viewer feedback associated with the digital photos displayed for viewing; and
determining a revised display sequence of the non-stacked photos and the representative photos based on the viewer feedback.

9. A method as recited in claim 8, further comprising:
determining a different representative photo from the similar photos in a stack based on the viewer feedback.

10. A method as recited in claim 8, wherein said receiving the viewer feedback includes receiving the viewer feedback as at least one of identifiers of photos selected for viewing, photo display durations of the selected photos, viewer preferences for the selected photos, and viewer photo approval.

11. A method as recited in claim 7, wherein said analyzing the image content of each photo includes analyzing the image content based on at least one of object recognition, facial recognition, and facial composition.

12. A method as recited in claim 7, wherein said determining the representative photo from the similar photos in a stack includes determining the representative photo based on a photo importance formula that is a function of image content factors.

13. A method as recited in claim 7, wherein said determining the display sequence of the non-stacked photos and the representative photos includes determining the display sequence based on a photo importance formula that is a function of image content factors and a quantity of the similar photos in each of the stacks of similar photos.

14. A method as recited in claim 7, further comprising:
organizing the set of digital photos into chapters, wherein each chapter includes a subset of the digital photos, and the chapters are organized based on a timestamp of each digital photo and time gaps between the subsets of the digital photos.

15. A computer-readable storage media device comprising a photo analyzer stored as instructions that are executable and, responsive to execution of the instructions by a processor of a computing device, the computing device performs operations of the photo analyzer comprising to:
analyze image content of each photo in a set of digital photos;
determine similar photos in the set of digital photos based on the image content and metadata of the digital photos;
create stacks of the similar photos;
determine a representative photo from the similar photos in each stack; and
determine a display sequence to display non-stacked photos and the representative photos of each stack.

16. The computer-readable storage memory device as recited in claim 15, wherein the computing device performs the operations of the photo analyzer further comprising to:
receive viewer feedback associated with the digital photos displayed for viewing;
determine a different representative photo from the similar photos in a stack based on the viewer feedback; and
determine a revised display sequence of the non-stacked photos and the representative photos based on the viewer feedback.

17. The computer-readable storage memory device as recited in claim 16, wherein the computing device performs the operations of the photo analyzer further comprising to receive the viewer feedback as at least one of identifiers of photos selected for viewing, photo display durations of the selected photos, viewer preferences for the selected photos, and viewer photo approval.

18. The computer-readable storage memory device as recited in claim 15, wherein the computing device performs the operations of the photo analyzer further comprising to analyze the image content of each photo based on at least one of object recognition, facial recognition, and facial composition.

19. The computer-readable storage memory device as recited in claim 15, wherein the computing device performs the operations of the photo analyzer further comprising to determine the representative photo from the similar photos in a stack based on a photo importance formula that is a function of image content factors.

20. The computer-readable storage memory device as recited in claim 15, wherein the computing device performs the operations of the photo analyzer further comprising to determine the display sequence of the non-stacked photos and the representative photos based on a photo importance formula that is a function of image content factors and a quantity of the similar photos in each of the stacks of similar photos.

* * * * *

UNITED STATES PATENT AND TRADEMARK OFFICE
CERTIFICATE OF CORRECTION

| | | |
|---|---|---|
| PATENT NO. | : 8,983,150 B2 | Page 1 of 1 |
| APPLICATION NO. | : 13/717367 | |
| DATED | : March 17, 2015 | |
| INVENTOR(S) | : Dockhorn et al. | |

It is certified that error appears in the above-identified patent and that said Letters Patent is hereby corrected as shown below:

In the Claims

Column 16, Line 1, after "A computer-readable storage", delete "media", insert -- memory --, therefor.

Signed and Sealed this
Eleventh Day of August, 2015

Michelle K. Lee
*Director of the United States Patent and Trademark Office*